United States Patent Office 3,529,444
Patented Sept. 22, 1970

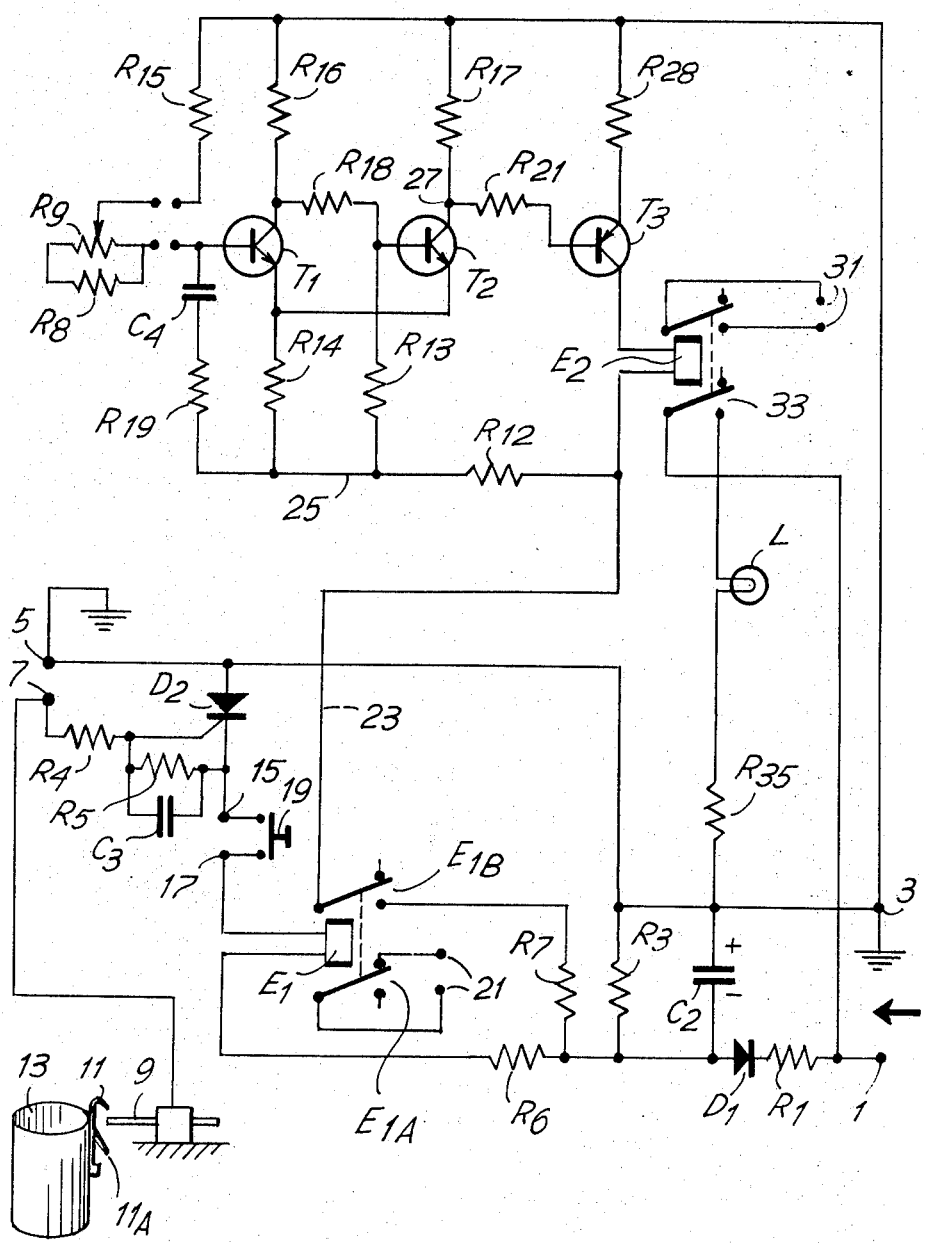

3,529,444
CIRCULAR KNITTING MACHINES
Luciano Romoli, Florence, Italy, assignor to
G. Billi & C. S.p.A., Florence, Italy
Filed Mar. 1, 1968, Ser. No. 709,612
Claims priority, application Italy, Mar. 7, 1967,
789,708
Int. Cl. D04b 35/18
U.S. Cl. 66—157        8 Claims

ABSTRACT OF THE DISCLOSURE

A motor driven circular knitting machine having a plurality of latch needles, includes an electronic circuit for stopping the driving motor in response to breakage of yarn.

The electronic circuit includes an electrically conductive probe so disposed as to be contacted by a needle latch which has been radially displaced as a result of yarn breakage, the contact between latch and probe energising the electronic circuit to supply a reverse current to the motor to rapidly halt the motor.

---

This invention relates to fault responsive electrical circuits and in particular to a fault responsive electrical circuit for use in a circular knitting hosiery machine to provide an indication of yarn breakage.

The present invention provides an electronic circuit arrangement for stopping a motor driven needle cylinder of a circular knitting hosiery machine in response to a yarn discontinuity which enables outward movement of the latches of needles on the needle cylinder, comprising an electronic memory circuit including a controlled diode, or equivalent gated or triggered electronic switch component, operable in response to outward movement of a latch due to yarn breakage to energise a first relay to interrupt the motor driving the needle cylinder, and a delay circuit including a capacitor, resistance means and a triggering circuit operative to generate a pulse of predetermined duration in response to energisation of the first relay, switching means responsive to the pulse to energise a second relay, the second relay being arranged to supply the motor with a reverse-current for the duration of the pulse, and reset means for re-setting the diode.

The present invention further provides circular knitting machines having a plurality of latch needles, an electric driving motor and electronic means for stopping the motor in response to breakage of the yarn, the electronic means comprising an electrically conductive probe, so disposed as to be contacted by a needle latch which has been radially displaced as a result of yarn breakage, and a first circuit including the probe which is energised in response to contact between the probe and the latch, switch means in the circuit which are closed and remain closed in response to energisation of the circuit, and a second circuit which is energised in response to closure of the switch means and effective when energised to produce an output pulse of predetermined duration, and means responsive to the pulse to supply a reverse current to the motor driving the machine for the predetermined duration.

A fault responsive electrical circuit for use with a circular hosiery machine will now be described by way of example, with reference to the accompanying drawing which shows a circuit diagram.

As shown in the drawing two input terminals 1 and 3 of the circuit are supplied by an alternating current source, the terminal 3 being grounded. The supply current passes through a current-limiting resistor $R_1$ and is rectified by a series connected diode $D_1$, which is advantageously a silicon diode. The parallel circuit combination of a smoothing capacitor $C_2$ and a ballast resistance $R_3$ is connected between ground and the anode of diode $D_1$ to provide a stabilised DC output.

The DC output supplies a memory circuit which includes a terminal 5 which is grounded and a terminal 7 electrically connected to an electrically conductive finger 9. The finger 9 is so arranged adjacent a rotating needle cylinder 13 of a circular knitting hosiery machine that the latches 11A of the needles 11 on the cylinder 13 contact the finger, when the yarn breaks since the centrifugal force on the latch due to rotation of the cylinder is no longer fully opposed by the stitch which is being cleared and which is loosened in the event of the breakage of the yarn. The cylinder and needles are grounded so that when the yarn breaks, the latches which are normally restrained by the yarn, move outwardly under centrifugal force into contact with the finger 9 so as to short circuit terminals 5 and 7. A controlled diode $D_2$ has its anode connected to terminal 5 and its control electrode connected to terminal 7. The diode $D_2$ is designed to become conductive and remain conductive even if only a very weak current is caused to flow, when the terminals 5 and 7 are short circuited. When the diode $D_2$ becomes conductive it energises a relay $E_1$, as will be hereinafter described. A resistor $R_4$ forms the connection between the control electrode of diode $D_2$ and the terminal 7. The resistance $R_4$ thus limits the current of the control electrode of the diode $D_2$, so as to avoid the formation of a spark between the needle latches and the finger 9. The switching current for the diode $D_2$ is of the order of only a few micro-amperes. The parallel combination of a resistor $R_5$ and a capacitance $C_3$ is connected between the control electrode and cathode of the diode. This arrangement tends to make the memory circuit insensitive to spurious signals, due for example, to sparks on the machine, and to other spurious signals which may be generated in the vicinity of the electronic circuit, furthermore, the parallel combination $C_3-R_5$ attenuates peak currents. The impedance of this circuit is thus low.

A reset push-button 19 is provided betwen the cathode of the diode $D_2$ and the coil of the relay $E_1$, by means of connection terminals 15, 17. This push-button 19 is usually closed and can be operated to return the diode to its nonconductive state in the absence of a short circuit between the terminals 7 and 5. When the relay $E_1$ is energised the current path for the energising coil being completed by a resistance $R_6$ connected to the DC supply, its contacts $E_{1A}$ are opened. A relay (not shown) which controls the supply to a driving motor of the hosiery machine, has the contacts $E_{1A}$ in series with its energising coil through terminal 21 so that when contacts $E_{1A}$ are open it becomes de-energised, to interrupt the supply to the motor. The relay $E_1$ also has contacts $E_{1B}$ which, upon the energisation of the relay $E_1$ connect the DC supply via conductors 25 and 23 and current-limiting resistance $R_7$ to a delay circuit.

The delay circuit includes two transistors $T_1$ and $T_2$ which form a triggering circuit which is designed to generate a single square wave pulse, whose duration is adjustable by means of a timing circuit consisting of a capacitor $C_4$, (which is advantageously a tantalum capacitor) and a variable resistance arrangement formed by a fixed resistor $R_8$ and a variable resistance $R_9$ for finely adjusting the square wave. The pulse width of the square wave represents the value of the delay and thus the duration of reverse current which is applied to the driving motor to enable it to be quickly stopped as will be described hereinafter. $R_{12}$ forms a current-limiting resistance in the conductor 25, while $R_{13}$, $R_{14}$, $R_{15}$, $R_{16}$, $R_{17}$, $R_{18}$ form the connection resistances of the transistors $T_1$ and $T_2$ with the conductor 25 and ground. The resistance $R_{15}$ is connected to the variable resistance $R_9$, and the resistance $R_{19}$ forms the charging path for the capacitor $C_4$. Once the contacts $E_{1B}$ have been closed the capacitor $C_4$ will charge and remain charged and not be effected by the mutual influence and of the biasing of the transistors $T_1$ and $T_2$. After closure of contacts $E_{1B}$ a single square wave pulse, having a duration dependent upon the values of the capacitor $C_4$ and upon the resistances $R_7$, $R_9$ is generated at the collector 27 of transistor $T_2$.

The single signal which is generated at the collector 27 is fed through a resistance $R_{21}$ to the base of a switching transistor $T_3$, the emitter of which is connected to ground through a resistance $R_{28}$, and the collector of which is connected by means of the coil of a relay $E_2$ to the conductor 23. The single signal causes the transistor $T_3$ to switch ON thereby energising the relay $E_2$. The relay $E_2$ therefore remains energised for the duration of the square wave pulse which is generated by the delay circuit. Therefore, the duration of the energisation of the relay $E_2$ is dependent upon the values of the components $C_4$ and $R_9$. The relay $E_2$ when energised closes contacts 31 which supply a reverse current to the motor for the duration of the single signal. A second set of contacts 33 of the relay $E_2$ control a warning lamp L, which is connected to the DC rectifier through a series resistance $R_{35}$.

On de-energisation of the relay $E_2$ the reverse current supply to the motor is interrupted and the motor remains de-energised until the push-button 19 is operated.

The circuit in its stand-by condition consumes virtually no current, and as the delay and memory circuit pass no current during stand-by conditions it is almost completely insensitive to spurious signals during this time. If however, spurious signals occur under fault conditions when the circuits are actuated the short pulse width output signal remains substantially uneffected, as the switching of the two transistors $T_1$ and $T_2$ is determined by the biasing of the transistors and by the constant RC network. The tantalum capacitor $C_4$ has a substantially stable characteristic and so ensures that the pulse width of the output signal is substantially constant.

The fault sensitive circuit does not require a particularly stabilised supply but may operate safely under conditions even with abrupt and wide veriations of the supply voltage.

The fault sensitive circuit can be made with solid state elements which comply with wide inspection and reliability requirements. The circuit may operate over a very wide temperature range above and below 0° centigrade.

The components can be advantageously mounted in a box which may be easily extracted and replaced in event of failure, the connection to the different components outside the box being made by means of a terminal board, which may be arranged in such a manner as to reduce the possibility of making an incorrect connection.

The circuit can be assembled with all its components on a small printed circuit board, having rigid wire terminals connected on one side. The circuit board, if the circuit is completely transistorized, can be housed in a metal casing and encapsulated with a resin (such as an epoxy resin) which is suitable to protect the electronic components against dust, moisture, shocks and the like. The board may be inserted into a terminal connector for connection to the several predetermined connecting members.

In a modification the memory circuit can be in the form of a multivibrator of the so-called "flip-flop" type. The two relays may be replaced by suitable equivalent and compact elements of the electric or electronic type. The delay circuit can be in the form of a variable time constant circuit which is arranged to directly trigger the contacts 31. Provision may also be made to trigger the delay circuit with a signal at the circuit input, that is at 1 and 3.

I claim:

1. In a circular knitting hosiery machine having a needle cylinder, a motor in driving connection with said needle cylinder and a plurality of electrically conductive latch needles whose latches are radially displaced in response to yarn breakage, the novel combination comprising an electrically conductive probe, means mounting said probe adjacent said needle cylinder for contacting a needle latch which has been radially displaced in response to yarn breakage, said radially displaced latch and said probe forming a first switch, an electronic memory circuit including, a controlled electronic switch having an anode, a cathode and a control electrode, a first relay having an energizing coil and first and second sets of switch contacts, means connecting the anode-cathode path of said electronic switch and the energising coil of said relay in series to an electric current source, and means connecting said controlled electrode and said first switch in series to said electrical source, for causing said electronic switch to become conductive and remain conductive upon a closure of said first switch, a first motor-controlling relay having an energising coil for controlling the motor driving said needle cylinder, means connecting said second set of contacts in series with the energizing coil of said motor-controlling relay, said motor being deenergized upon opening of said second set of contacts, a delay circuit including, a resistance-capacitance timing circuit, for providing a time variable output in response to energization of said delay circuit, a triggering circuit connected to said timing circuit to receive said time variable output, said triggering circuit being responsive to the output of said timing circuit to produce an output pulse of predetermined duration, means connecting said delay circuit to said current source through said first set of contacts for energizing said delay circuit upon closure of said first set of contacts, a second motor-controlling relay having an energizing coil connected in said delay circuit for energization by said pulse of predetermined duration, said second motor-controlling relay having contacts connected to the motor to supply a reverse current to the motor upon energization of said second motor-controlling relay, and a reset means connected in series with the anode-cathode path of said electronic switch for rendering said electronic switch non-conductive.

2. The combination according to claim 1 including:
    a resistance,
    a capacitance, and
    means connecting said resistance and capacitance in parallel between the cathode and control electrode of the electronic switch for rendering the memory circuit substantially insensitive to spurious signals.

3. The combination according to claim 1 wherein said resistance-capacitance timing circuit comprises:
    a tantalum capacitor,
    resistance means, and
    conductive means connecting said capacitor and resistance means to said current source.

4. The combination according to claim 3 wherein said resistance means comprises a fixed resistor, a variable resistor and conductive means interconnecting said resistors.

5. The combination according to claim 1, in which said electronic switch is a controlled diode.

6. In a circular knitting machine having an electric driving motor, a rotary needle cylinder driven by the motor and a plurality of electrically conductive latch needles on said cylinder, the latches of said needles being radially displaceable in response to breakage of the yarn, the novel combination comprising an electrically conductive probe, means mounting said probe adjacent the path of movement of said latch needles for contacting a needle latch which has been radially displaced in response to yarn breakage, said radially displaced latch and said probe forming a switch, a first circuit connecting said probe and said latch needles to an electric supply source for energizing the circuit in response to contact of said probe with a radially displaced needle latch, the circuit further comprising switch means adapted to be closed and remain closed upon energization of said circuit, means connecting an electronic circuit to said switch means for energization upon closure of said switch means, to produce an output pulse of predetermined duration, control means connected to said motor and effective, when energized, to supply a reverse current to said motor, said control means being connected to said electronic circuit to be energized thereby upon receipt of said pulse of predetermined duration, said switch means comprising a controlled rectifier having an anode, a cathode and a control electrode, and a relay having an energizing coil and a set of normally open contacts, the control electrode of said rectifier being in series with the switch formed by said probe and latch, said energizing coil being in series with the anode-cathode path of said rectifier, and said contacts being in series with an energizing supply for said electronic circuit.

7. The combination according to claim 6 wherein said switch means comprises a resistor and a capacitor connected in parallel between the control electrode and cathode of said rectifier.

8. In a circular knitting machine having an electric driving motor, a rotary needle cylinder driven by the motor and a plurality of electrically conductive latch needles on said cylinder, the latches of said needles being radially displaceable in response to breakage of the yarn, the novel combination comprising an electrically conductive probe, means mounting said probe adjacent the path of movement of said latch needles for contacting a needle latch which has been radially displaced in response to yarn breakage, said radially displaced latch and said probe forming a switch, a first circuit connecting said probe and said latch needles to an electric supply source for energizing the circuit in response to contract of said probe with a radially displaced needle latch, the circuit further comprising switch means adapted to be closed and remain closed upon energization of said circuit, means connecting an electronic circuit to said switch means for energization upon closure of said switch means, to produce an output pulse of predetermined duration, control means connected to said motor and effective, when energized, to supply a reverse current to said motor, said control means being connected to said electronic circuit to be energized thereby upon receipt of said pulse of predetermined duration, said electronic circuit comprising a resistive-capacitive timing circuit, said timing circuit being connected for energization by said switch means and a trigger circuit connected to said timing circuit and responsive to the output of said timing circuit, upon energization of said electronic circuit, to produce said output pulse of predetermned duration.

References Cited

UNITED STATES PATENTS

| | | | |
|---|---|---|---|
| 2,506,645 | 5/1950 | Kellog et al. | 66—157 |
| 2,636,367 | 4/1953 | St. Pierre et al. | 66—163 |
| 2,933,909 | 4/1960 | Hanzl et al. | 66—163 XR |
| 2,963,890 | 12/1960 | Hoots | 66—157 |
| 3,004,417 | 10/1961 | Lunak | 66—157 |
| 3,043,991 | 7/1962 | Schneider et al. | 57—81 XR |
| 3,317,734 | 5/1967 | Martin. | |
| 3,397,556 | 8/1968 | Wood | 66—157 XR |

FOREIGN PATENTS 572,941  10/1945  Great Britain.

WM. CARTER REYNOLDS, Primary Examiner

U.S. Cl. X.R.

66—163, 165